United States Patent
Watanabe (10) Patent No.: US 10,592,824 B2
(45) Date of Patent: Mar. 17, 2020

(54) MACHINE LEARNING DEVICE AND THERMAL DISPLACEMENT COMPENSATION DEVICE

(71) Applicant: FANUC CORPORATION, Yamanashi (JP)

(72) Inventor: Mitsunori Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 86 days.

(21) Appl. No.: 15/920,820

(22) Filed: Mar. 14, 2018

(65) Prior Publication Data
US 2018/0276570 A1 Sep. 27, 2018

(30) Foreign Application Priority Data
Mar. 21, 2017 (JP) .................. 2017-054267

(51) Int. Cl.
*G06N 20/00* (2019.01)
*G05B 19/18* (2006.01)

(52) U.S. Cl.
CPC ........... *G06N 20/00* (2019.01); *G05B 19/182* (2013.01); *G05B 2219/49307* (2013.01)

(58) Field of Classification Search
CPC .................. G06N 20/00; G05B 19/182; G05B 2219/49307
See application file for complete search history.

(56) References Cited

FOREIGN PATENT DOCUMENTS

| CN | 103926874 | | 7/2014 |
|----|-----------|---|--------|
| CN | 104972360 | | 10/2015 |
| CN | 106488828 | | 3/2017 |
| JP | 6-8107 | | 1/1994 |
| JP | 07-075937 | * | 3/1995 |
| JP | 7-75937 | | 3/1995 |
| JP | H08300242 A | * | 7/1995 |
| JP | 8-300242 | | 11/1996 |
| JP | 11-114776 | | 4/1999 |

(Continued)

OTHER PUBLICATIONS

Office Action dated May 5, 2019 in Chinese Application No. 201810215390.2.

*Primary Examiner* — Li B. Zhen
*Assistant Examiner* — Tewodros E Mengistu
(74) *Attorney, Agent, or Firm* — Wenderoth, Lind & Ponack, L.L.P.

(57) ABSTRACT

A calculation formula learning unit sets a coefficient relating to a time lag element in a thermal displacement estimation calculation formula by machine learning while fixing a coefficient relating to measured data except the coefficient relating to the time lag element at a predetermined value based on a difference between a thermal displacement estimated value about a machine element calculated by substituting a measured data group into the thermal displacement estimation calculation formula and a thermal displacement actual measured value about the machine element; sets the coefficient relating to the measured data except the coefficient relating to the time lag element in the thermal displacement estimation calculation formula by machine learning based on the difference while fixing the coefficient relating to the time lag element at a predetermined value; and repeats the machine learning.

10 Claims, 9 Drawing Sheets

(56) References Cited

FOREIGN PATENT DOCUMENTS

| | | | |
|---|---|---|---|
| JP | 2003094291 A | * | 3/2003 |
| JP | 2003-94291 | | 4/2003 |
| JP | 2004-154907 | | 6/2004 |
| JP | 2005-186216 | | 7/2005 |
| JP | 2010-120150 | | 6/2010 |
| JP | 4488564 | | 6/2010 |

* cited by examiner

FIG. 7

MACHINE LEARNING DEVICE AND THERMAL DISPLACEMENT COMPENSATION DEVICE

This application is based on and claims the benefit of priority from Japanese Patent Application No. 2017-054267, filed on 21 Mar. 2017, the content of which is incorporated herein by reference.

BACKGROUND OF THE INVENTION

Field of the Invention

The present invention relates to a machine learning device and a thermal displacement compensation device used for a machine tool.

Related Art

One of the main factors of a machining error in a machine tool has been relative thermal displacement caused between a tool and a workpiece by thermal expansion of a machine element in the machine tool. Specific examples of a component in the machine tool include a spindle, a spindle unit, a bed, a column, a work table, and a tool. These components, especially the spindle, are thermally deformed by generation of heat by rotation of the spindle, generation of heat from a spindle drive motor, absorption of heat by a coolant supplied from a coolant supplier to the tool, and absorption of heat by a lubrication oil supplied from a lubrication oil supplier to a spindle bearing, for example. As a result, in some cases, relative thermal displacement is caused between the tool and the workpiece.

According to a technique conventionally used in response to this issue, a command value for a numerical controller for control of a machine tool is compensated in consideration of influence by thermal expansion of a spindle caused by various heat sources such as a heat source near the spindle in the machine tool and outside air temperature, thereby increasing machine accuracy (see Patent Document 1, for example).

Patent Document 1: Japanese Unexamined Patent Application, Publication No. H07-75937

SUMMARY OF THE INVENTION

However, Patent Document 1 merely mentions installation of multiple temperature sensors as a method of acquiring a characteristic value about the machine tool. Hence, the technique of Patent Document 1 does not ensure highly accurate compensation.

Further, it takes time for heat measured by the temperature sensor to be transferred and to cause thermal expansion. Hence, it is required to evaluate time delay for highly accurate compensation, leading to a complicated compensation formula.

Additionally, a structure or a member changes depending on the machine on which numerical controllers are to be installed. Hence, an optimum thermal displacement compensation formula is changed in response to a machine type.

The technique described in Patent Document 1 uses a neural network for estimation of a thermal displacement. Machine learning methods including one using a neural network generally require a large number of calculations. This has made it impossible to handle a complicated model using an inexpensive numerical controller.

In view of the foregoing circumstances, the present invention is intended to provide a machine learning device capable of deriving a highly accurate compensation formula using a small number of calculations, and a thermal displacement compensation device capable of achieving highly accurate compensation based on the compensation formula.

(1) A machine learning device according to the present invention is a machine learning device (machine learning device 10, 10A described later, for example) that optimizes, by machine learning, a calculation formula used for estimating the thermal displacement of a machine element to be thermally expanded in a machine tool (machine tool 35 described later, for example) based on a measured data group containing temperature data about the machine element and its surroundings and/or operating state data about the machine element. The machine learning device comprises: a measured data acquisition unit (measured data acquisition unit 11 described later, for example) that acquires the measured data group; a thermal displacement acquisition unit (thermal displacement acquisition unit 12 described later, for example) that acquires a thermal displacement actual measured value about the machine element; a storage unit (storage unit 13 described later, for example) that uses the measured data group acquired by the measured data acquisition unit as input data, uses the thermal displacement actual measured value about the machine element acquired by the thermal displacement acquisition unit as a label, and stores the input data and the label in association with each other as teaching data; and a calculation formula learning unit (calculation formula learning unit 14 described later, for example) that performs machine learning based on the measured data group and the thermal displacement actual measured value about the machine element, thereby setting a thermal displacement estimation calculation formula used for calculating the thermal displacement of the machine element based on the measured data group. The thermal displacement estimation calculation formula uses a time lag element in measured data. The calculation formula learning unit comprises: a first learning unit (first learning unit 14A described later, for example) that sets a coefficient relating to the time lag element in the thermal displacement estimation calculation formula by machine learning while fixing a coefficient relating to the measured data except the coefficient relating to the time lag element at a predetermined value based on a difference between a thermal displacement estimated value about the machine element calculated by substituting the measured data group in a predetermined period stored as the teaching data in the storage unit into the thermal displacement estimation calculation formula and the thermal displacement actual measured value about the machine element in the predetermined period stored as the label in the storage unit; a second learning unit (second learning unit 14B described later, for example) that sets the coefficient relating to the measured data except the coefficient relating to the time lag element in the thermal displacement estimation calculation formula by machine learning based on the difference while fixing the coefficient relating to the time lag element at a predetermined value; and a repetition unit (repetition unit 14C described later, for example) that repeats machine learning by the first learning unit and machine learning by the second learning unit in such a manner that the second learning unit performs the machine learning while fixing the coefficient relating to the time lag element in the thermal displacement estimation calculation formula set by the machine learning by the first learning unit, and that the first learning unit performs the machine learning while fixing the coefficient relating to the measured data except the coefficient relating to the time lag element in the thermal displacement estimation calculation formula set by the machine learning by the second learning unit.

(2) In the machine learning device described in (1), the measured data acquisition unit (measured data acquisition unit 11 described later, for example) may further acquire a second measured data group by adding measured data to the measured data group and/or by excluding measured data from the measured data group. The measured data acquisition unit may store the second measured data group as input data into the storage unit (storage unit 13 described later, for example). The calculation formula learning unit (calculation formula learning unit 14 described later, for example) may further set a second thermal displacement estimation calculation formula used for calculating the thermal displacement of the machine tool based on the second measured data group.

(3) In the machine learning device described in (1) or (2), the time lag element may be a first-order lag element in measured data in the measured data group.

(4) In the machine learning device described in (1) or (2), the time lag element may be a time shift element in measured data in the measured data group.

(5) In the machine learning device described in (1) to (4), the second learning unit (second learning unit 14B described later, for example) may perform the machine learning of the thermal displacement estimation calculation formula set based on a multiple regression analysis model.

(6) The machine learning device described in (1) to (5) may be incorporated in a controller (controller 30 described later, for example) for the machine tool (machine tool 35 described later, for example).

(7) A thermal displacement compensation device according to the present invention (thermal displacement compensation device 20 described later, for example) comprises: a compensation value calculation unit (compensation value calculation unit 22 described later, for example), where based on the thermal displacement estimation calculation formula set by the machine learning device described in (1) to (6) (machine learning device 10 described later, for example), the compensation value calculation unit calculates a compensation value corresponding to the thermal displacement of the machine element calculated from the measured data group; and a compensation unit (compensation unit 24 described later, for example) that compensates the machine position of the machine element based on the compensation value about the machine element calculated by the compensation value calculation unit.

(8) The thermal displacement compensation device described in (7) may be incorporated in the controller (controller 30 described later, for example) for the machine tool (machine tool 35 described later, for example).

According to the present invention, a highly accurate compensation formula can be derived using a small number of calculations, and highly accurate compensation can be achieved based on the compensation formula.

DETAILED DESCRIPTION OF THE INVENTION

First Embodiment

Figure 1:
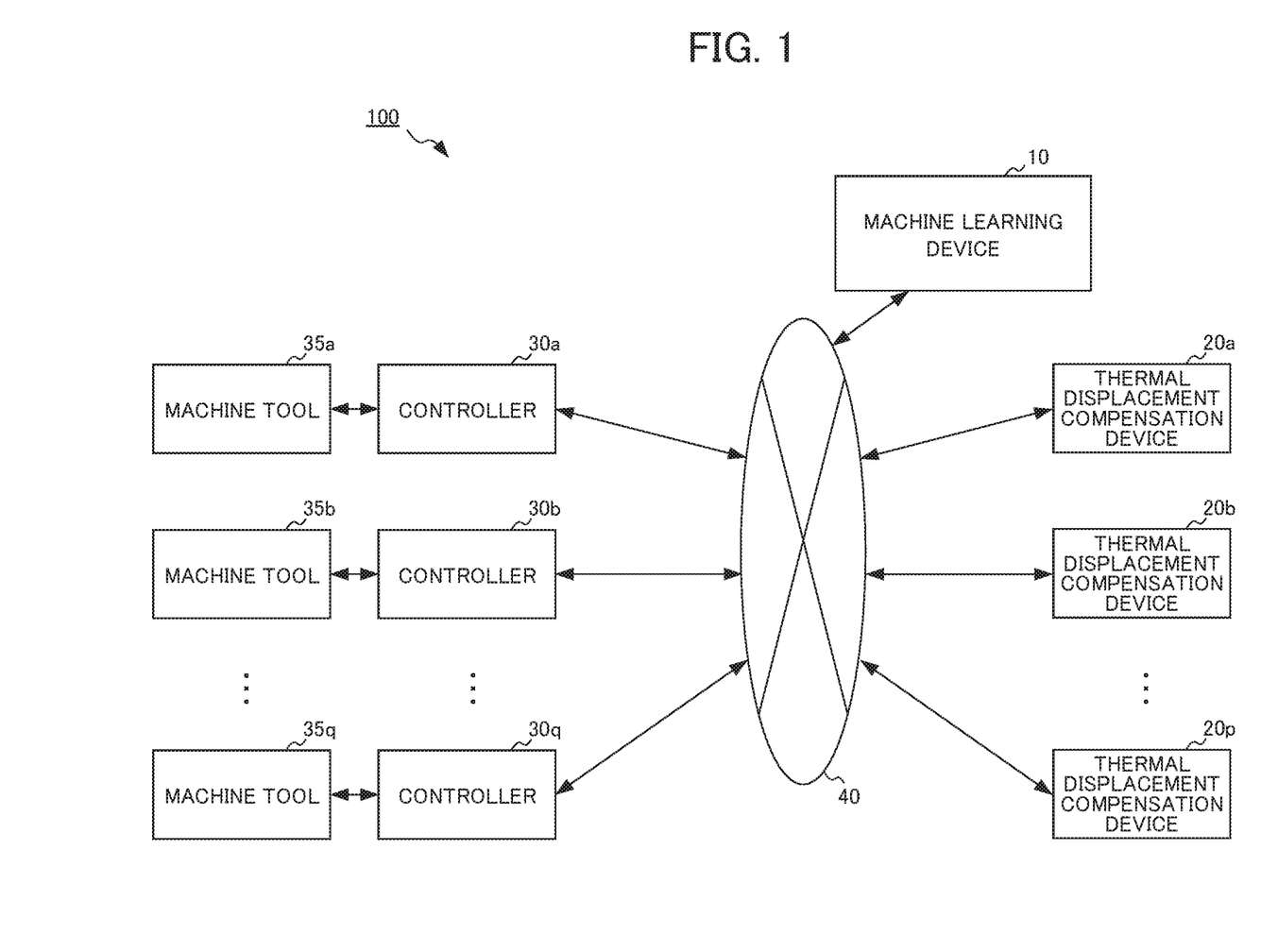
FIG. 1 is a block diagram showing a thermal displacement compensation system according to a first embodiment of the present invention.
Figure 2:
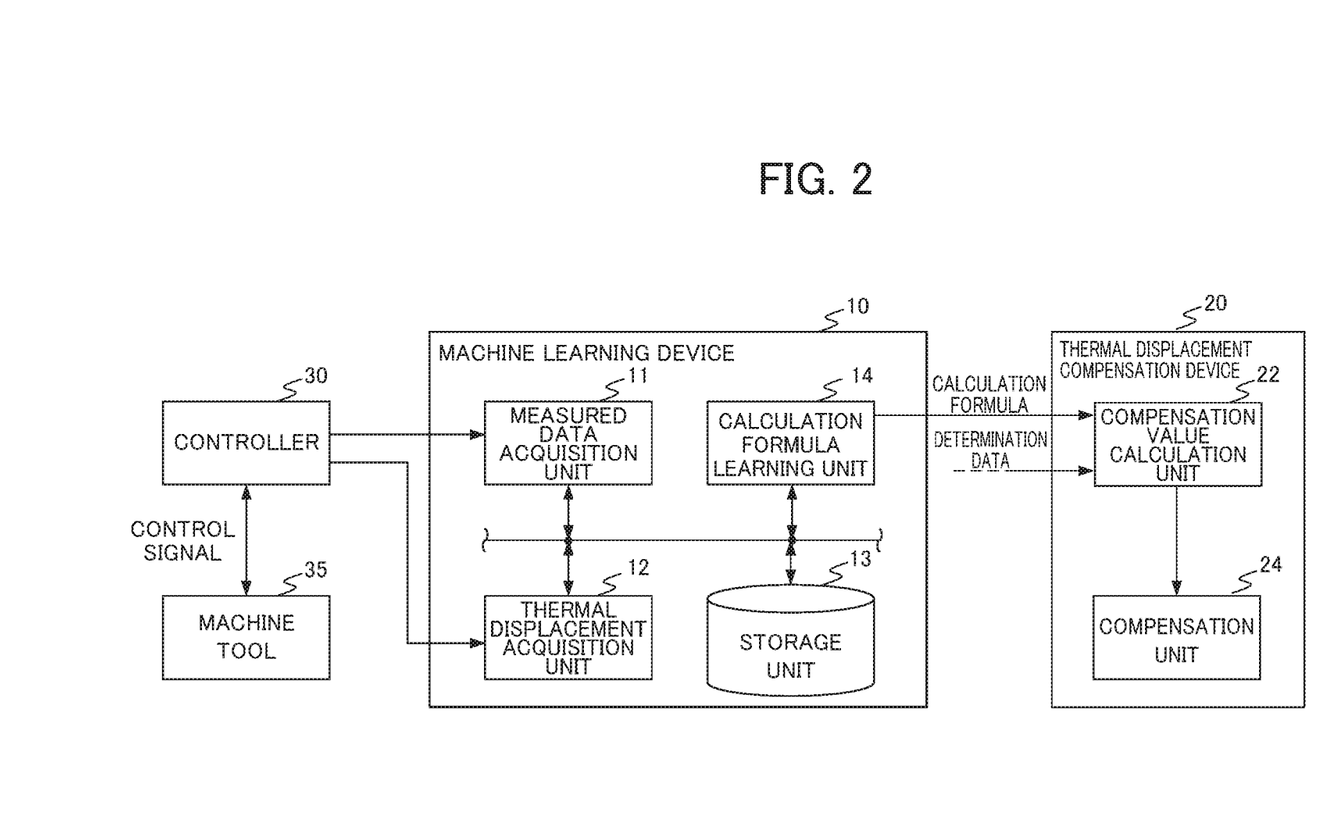
FIG. 2 is a block diagram showing a machine learning device and a thermal displacement compensation device according to the first embodiment of the present invention in detail.
Figure 3:
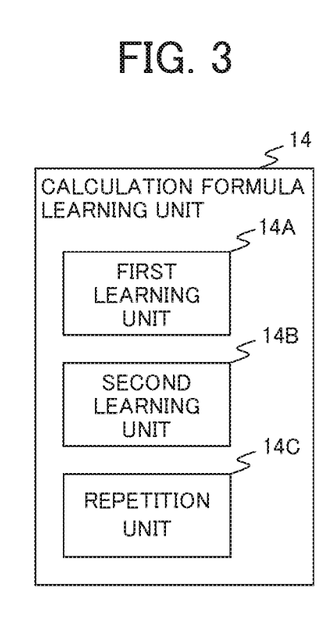
FIG. 3 is a block diagram showing a calculation formula learning unit according to the first embodiment of the present invention in detail.
Figure 4:
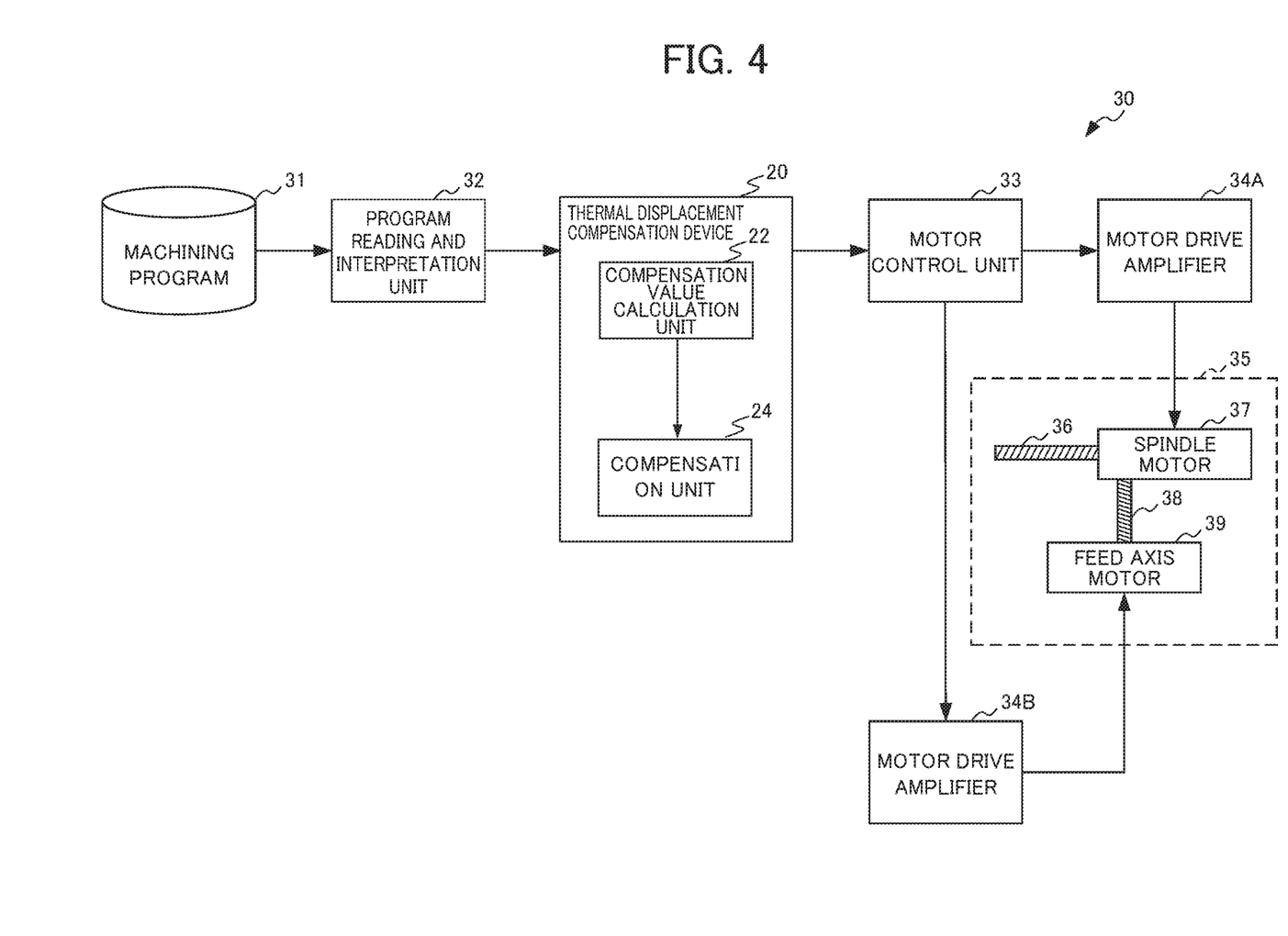
FIG. 4 is a block diagram showing a machine tool and a controller according to the first embodiment of the present invention in detail.

A first embodiment of the present invention will be described below based on the drawings. FIG. 1 is a block diagram showing a thermal displacement compensation system according to this embodiment. FIG. 2 is a block diagram showing a machine learning device and a thermal displacement compensation device according to this embodiment in detail. FIG. 3 is a block diagram showing a calculation formula learning unit according to this embodiment in detail. FIG. 4 is a block diagram showing a machine tool and a controller according to this embodiment in detail.

<Configuration of Thermal Displacement Compensation System 100>

The configuration of a thermal displacement compensation system 100 according to this embodiment is described first. As shown in FIG. 1, the thermal displacement compensation system 100 includes a machine learning device 10, a thermal displacement compensation device 20, a controller 30, a machine tool 35, and a network 40. The number of machine learning devices 10, that of the thermal displacement compensation devices 20, that of the controllers 30, and that of the machine tools 35 may be one, or two or more.

One controller 30 and one machine tool 35 form a pair and are connected in a manner that allows communication therebetween. Multiple pairs each including one controller 30 and one machine tool 35 may be installed in the same factory or different factories, for example.

The machine learning device 10, the thermal displacement compensation device 20, the controller 30, and the machine tool 35 are connected to the network 40 and are allowed to communicate with each other through the network 40. For example, the network 40 is a local area network (LAN) constructed in a factory, the Internet, a public telephone network, or a combination of these networks. There is no particular limitation on the communication through the network 40 in terms of a specific communication system or in terms of whether the communication is established via wires or without wires. The thermal displacement compensation device 20 and the controller 30 may not be configured to communicate with each other using the network 40 but may be configured to be directly connected through a connection unit. The machine learning device 10 and the controller 30 may be directly connected through a connection unit.

The functions of these devices in the thermal displacement compensation system 100 will be described next based on FIG. 2. FIG. 2 is a block diagram showing a functional block in each device. All the thermal displacement compensation devices 20 have the same function. Thus, only one thermal displacement compensation device 20 is shown in FIG. 2. Likewise, all the controllers 30 have the same function and all the machine tools 35 have the same function. Thus, only one controller 30 and only one machine tool 35 are shown in FIG. 2. The network 40 existing between the devices is omitted from FIG. 2.

As shown in FIG. 4, the machine tool 35 performs machining using a spindle 36 to which a cutter is attached and which is rotated by a spindle motor 37, and a feed axis 38 for feeding the spindle 36. Specifically, the cutter is rotated by the spindle motor 37 for driving the spindle 36, and is fed by a feed axis motor 39 for driving the feed axis 38. While the machine tool 35 is described as a cutting machine in the embodiments, the machine tool 35 is not limited to the cutting machine.

As shown in FIGS. 2 and 4, the controller 30 feeds a control signal to the machine tool 35, thereby controlling the machine tool 35 so as to make the machine tool 35 perform the predetermined machining. The controller 30 stores multiple machining programs 31 determined in response to the detail of machining on a workpiece. The controller 30 includes: a program reading and interpretation unit 32 that reads and interprets the machining programs 31, thereby extracting conditions for machining (the frequency of acceleration or deceleration of the spindle, a spindle speed, cutting load, and cutting time, for example) and outputting position command data, etc. to the thermal displacement compensation device 20; a motor control unit 33 that generates an operation command for driving the spindle motor 37 and the feed axis motor 39 in the machine tool 35 based on position command data output from the thermal displacement compensation device 20 resulting from thermal displacement compensation; a motor drive amplifier 34A that amplifies the operation command and outputs the amplified operation command to the spindle motor 37 in the machine tool 35; and a motor drive amplifier 34B that amplifies the operation command and outputs the amplified operation command to the feed axis motor 39. The program reading and interpretation unit 32 may extract conditions for machining (the frequency of acceleration or deceleration of the spindle, a spindle speed, cutting load, and cutting time, for example) and output the extracted conditions to the thermal displacement compensation device 20. Regarding the conditions such as a spindle speed and cutting time, the controller 30 may output information about these conditions obtained in real time from the spindle motor 37 and/or the feed axis motor 39 to the thermal displacement compensation device 20. For acquisition of measured data, the controller 30 includes multiple terminals for connections to sensors attached to the machine tool 35. A sensor can be newly connected to the controller 30 and installed on the machine tool 35, or a sensor can be removed from the controller 30 by inserting or pulling out a cable of the sensor from the terminals. The arrangement of the sensors installed on the machine tool 35 can also be changed. The location change of a sensor can be such that the sensor is removed from the location in the machine tool 35 and the removed sensor is added to a changed location.

As shown in FIG. 2, the machine learning device 10 learns a thermal displacement estimation calculation formula for the machine tool 35 by machine learning with a teacher. For this learning, the machine learning device 10 includes a measured data acquisition unit 11, a thermal displacement acquisition unit 12, a storage unit 13, and a calculation formula learning unit 14.

The measured data acquisition unit 11 acquires a measured data group from the controller 30. The measured data mentioned herein may contain temperature data about a machine element in the machine tool 35 and its surroundings measured by a temperature sensor. The measured data may also contain operating state data about a machine element in the machine tool 35, more specifically, a physical value such as a spindle speed, the flow rate of a coolant to the spindle, or the amount of a lubrication oil to the spindle bearing in the machine tool 35 measured at a place where a temperature sensor cannot be attached, for example.

The thermal displacement acquisition unit 12 acquires a thermal displacement actual measured value about a machine element in the machine tool 35 measured with a probe, for example.

The storage unit 13 uses the measured data group acquired by the measured data acquisition unit 11 as input data, uses the thermal displacement actual measured value about the machine element acquired by the thermal displacement acquisition unit 12 as a label, and stores the input data and the label in association with each other as teaching data.

The calculation formula learning unit 14 performs machine learning based on the measured data group and the thermal displacement actual measured value about the machine element, thereby setting a thermal displacement estimation calculation formula used for calculating the thermal displacement of the machine element based on the measured data group. The thermal displacement estimation calculation formula is formulated by giving consideration to a time lag element in measured data. More specifically, due to the presence of multiple independent variables in the measured data group, a thermal displacement estimation calculation formula to be used is formulated by adding a time lag element in measured data to a polynomial set based on multiple regression analysis of a generalized linear model, for example. For example, the time lag element may be a first-order lag element in measured data or a time shift element in the measured data.

Assuming that a thermal displacement estimated value at time t is Y(t) and a measured value from a sensor $X_k$ at the time t is $X_k(t)$, a thermal displacement estimation calculation formula using a first-order lag element in measured data as a time lag element is expressed by the following formula (1):

[Formula 1]

$$Y(t) = \sum_{k=1}^{n} a_k \left( \sum_{\tau=0}^{T_k} X_k(t - \tau \Delta t_k) e^{-b_k \tau \Delta t_k} \right) \quad (1)$$

In this formula, $a_1, a_2, \ldots, a_n$ are coefficients determined by multiple regression analysis, and $b_1, b_2, \ldots, b_n$ and $T_k$ are coefficients corresponding to lags. Further, $\Delta t_k$ is sampling time of a measured value from the sensor $X_k$.

Assuming that a thermal displacement estimated value at the time t is Y(t) and a measured value from the sensor $X_k$ at the time t is $X_k(t)$, a thermal displacement estimation calculation formula using a time shift element in measured data as a time lag element is expressed by the following formula (2):

[Formula 2]

[Formula 2]

$$Y(t) = \sum_{k=1}^{n} a_k \left( \sum_{\tau=0}^{T_k} b_{k\tau} X_k(t - \tau \Delta t_k) \right) \quad (2)$$

In this formula, $a_0, a_1, \ldots, a_n$ are coefficients determined by multiple regression analysis, and $T_k$ and $b_{k0}, b_{k1}, \ldots, b_{kTk}$ are coefficients corresponding to lags. Further, $\Delta t_k$ is sampling time of a measured value from the sensor $X_k$.

The calculation formula learning unit 14 sets a thermal displacement estimation calculation formula to be obtained. Based on a difference between a thermal displacement estimated value about the machine element calculated by substituting the measured data group in a predetermined period stored as teaching data in the storage unit 13 into the thermal displacement estimation calculation formula and the thermal displacement actual measured value about the machine element in the predetermined period stored as a label in the storage unit 13, the calculation formula learning unit 14 sets the thermal displacement estimation calculation formula so as to minimize this difference by the least-square method, for example. More specifically, on the assumption that measured data (input data) is $X_1, X_2, \ldots, X_n$, a thermal displacement estimated value about each component forming the machine tool 35 such as a spindle, a bed, or a column is $f(X_1, X_2, \ldots, X_n)$ (n is a natural number), and a thermal displacement actual measured value is $Y_L$, the calculation formula learning unit 14 sets the thermal displacement estimation calculation formula that minimizes a difference between $f(X_1, X_2, \ldots, X_n)$ and $Y_L$.

FIG. 3 shows the calculation formula learning unit 14 in detail. More specifically, the calculation formula learning unit 14 includes a first learning unit 14A, a second learning unit 14B, and a repetition unit 14C.

On the assumption that measured data (input data) is $X_1, X_2, \ldots, X_n$, a thermal displacement estimated value about each component forming the machine tool 35 such as a spindle, a bed, or a column is $f(X_1, X_2, \ldots, X_n)$ (n is a natural number), and a thermal displacement actual measured value is $Y_L$, the first learning unit 14A sets a coefficient relating to a time lag element in a thermal displacement estimation calculation formula by machine learning while fixing a coefficient relating to measured data except the coefficient relating to the time lag element at a predetermined value so as to minimize a difference between $f(X_1, X_2, \ldots, X_n)$ and $Y_L$.

On the assumption that measured data (input data) is $X_1, X_2, \ldots, X_n$, a thermal displacement estimated value about each component forming the machine tool 35 such as a spindle, a bed, or a column is $f(X_1, X_2, \ldots, X_n)$ (n is a natural number), and a thermal displacement actual measured value is $Y_L$, the second learning unit 14B sets the coefficient relating to the measured data except the coefficient relating to the time lag element in the thermal displacement estimation calculation formula by machine learning while fixing the coefficient relating to the time lag element at a predetermined value so as to minimize a difference between $f(X_1, X_2, \ldots, X_n)$ and $Y_L$. The machine learning will be described in detail later.

The repetition unit 14C repeats the machine learning by the first learning unit 14A and the machine learning by the second learning unit 14B. More specifically, in a thermal displacement estimation calculation formula initially set, for example, the repetition unit 14C fixes the coefficient relating to the measured data except the coefficient relating to the time lag element in the thermal displacement estimation calculation formula. Then, the repetition unit 14C makes the first learning unit 14A perform the machine learning, thereby temporarily setting the coefficient relating to the time lag element in the thermal displacement estimation calculation formula. Next, in a thermal displacement estimation calculation formula temporarily set in this way, the repetition unit 14C fixes the coefficient relating to the time lag element in the thermal displacement estimation calculation formula. Then, the repetition unit 14C makes the second learning unit 14B perform the machine learning. As a result of the machine learning by the second learning unit 14B, the coefficient relating to the measured data except the coefficient relating to the time lag element in the thermal displacement estimation calculation formula is set temporarily. In a thermal displacement estimation calculation formula temporarily set in this way, the repetition unit 14C again fixes the coefficient relating to the measured data except the coefficient relating to the time lag element in the thermal displacement estimation calculation formula. Then, the repetition unit 14C makes the first learning unit 14A perform the machine learning. In this way, the repetition unit 14C repeats the machine learning by the first learning unit 14A and the machine learning by the second learning unit 14B. The repetition unit 14C finishes this repeat if a predetermined condition for the finish is satisfied. The finish condition may be satisfied if an error between a thermal displacement estimated value calculated using a thermal displacement estimation calculation formula temporarily set at that point and a thermal displacement actual measured value becomes a threshold or less and the accuracy of this thermal displacement estimation calculation formula becomes a predetermined value or more, for example. In this way, even in the case of a complicated thermal displacement estimation calculation formula, the calculation formula learning unit 14 repeats the machine learning by the first learning unit 14A and the machine learning by the second learning unit 14B. This makes it possible to reduce the number of calculations to be made simultaneously to allow installation of the calculation formula learning unit 14 on a relatively inexpensive device.

As shown in FIG. 2, the thermal displacement compensation device 20 includes a compensation value calculation unit 22 as a compensation value calculation means and a compensation unit 24 as a compensation execution means. The compensation value calculation unit 22 calculates a compensation value corresponding to the thermal displacement of the machine element calculated from the measured data group (determination data) based on the thermal displacement estimation calculation formula set by the machine learning device 10. The compensation unit 24 compensates the machine position of the machine element based on the compensation value about the machine element calculated by the compensation value calculation unit 22. Alternatively, the compensation unit 24 transmits this compensation value about the machine element to the controller 30. More specifically, as shown in FIG. 4, the compensation unit 24 compensates a condition for machining output from the program reading and interpretation unit 32 of the controller 30 using this compensation value about the machine element, and then outputs position command data to the motor control unit 33.

<Operation of Machine Learning>

Figure 5:
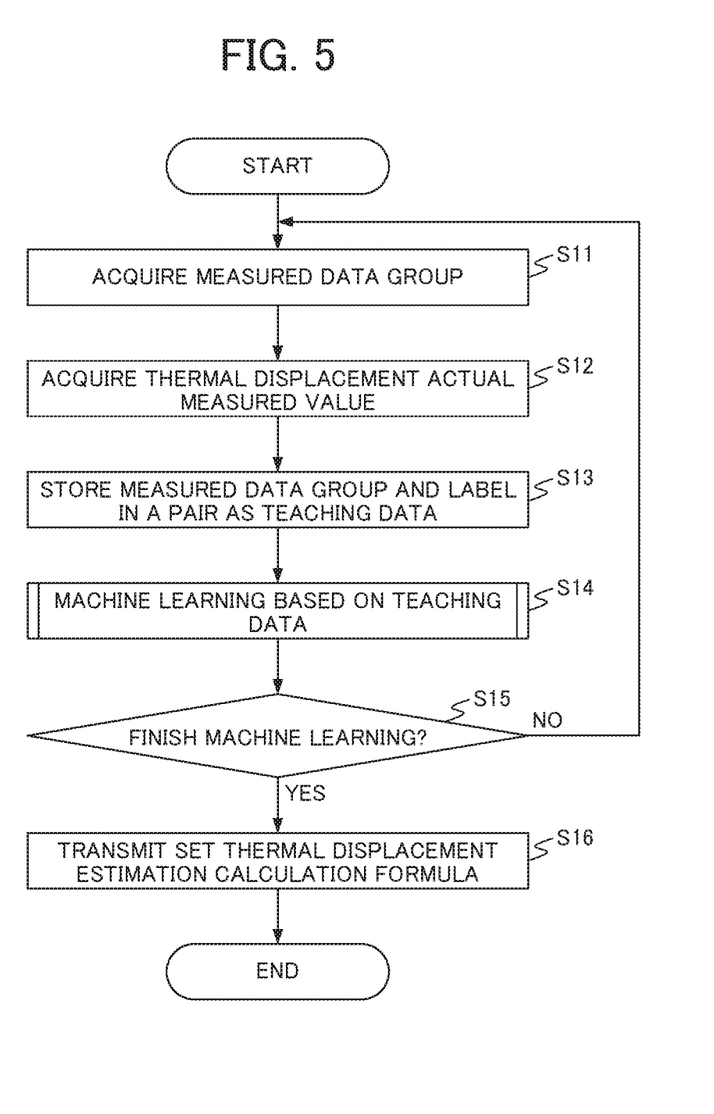
FIG. 5 is a flowchart showing the operation of machine learning by the machine learning device according to the first embodiment of the present invention.

The operation of machine learning in the thermal displacement compensation system 100 according to this embodiment will be described next. FIG. 5 is a flowchart showing the operation of the machine learning by the machine learning device 10.

In step S11, the measured data acquisition unit 11 of the machine learning device 10 acquires a measured data group from the controller 30. More specifically, the measured data acquisition unit 11 acquires temperature data about a machine element in the machine tool 35 and its surroundings and/or operating state data. The operating state data may contain a spindle speed, the flow rate of a coolant, and the flow rate of a lubrication oil, for example. The measured data to be acquired may not be data about a temperature itself but may be data about a temperature change, for example. The data about a temperature change to be acquired may be data about a temperature change from an initial temperature or may be data about a temperature change from a previously measured temperature to a currently measured temperature. The operating state data may also contain the amount of heat absorbed by a coolant or the amount of heat absorbed by a lubrication oil.

In step S12, the thermal displacement acquisition unit 12 of the machine learning device 10 acquires a thermal displacement actual measured value about the machine element in the machine tool 35 measured with a probe, for example. As a specific example, the thermal displacement acquisition unit 12 may measure a component in an X-axis direction, a component in a Y-axis direction, and a component in a Z-axis direction of the thermal displacement, and acquire a group of resultant measured values as the actual measured value.

In step S13, the storage unit 13 of the machine learning device 10 uses the measured data group acquired by the measured data acquisition unit 11 as input data, uses the thermal displacement actual measured value about the machine element acquired by the thermal displacement acquisition unit 12 as a label, and stores the input data and the label in a pair associated with each other as teaching data. The machine learning device 10 is capable of continuously acquiring the teaching data online and then performing machine learning described later. The machine learning device 10 is also capable of acquiring every teaching data in advance as batch data and then performing the machine learning described later using the acquired batch data. The machine learning device 10 is also capable of acquiring mini batch data by dividing this batch data into small groups and then performing the machine learning described later using the mini batch data.

In step S14, the calculation formula learning unit 14 of the machine learning device 10 performs machine learning based on the teaching data. Step S14 will be described in detail later.

In step S15, the calculation formula learning unit 14 of the machine learning device 10 determines whether to finish the machine learning or to repeat the machine learning. As described above, a condition for finishing the machine learning can be determined arbitrarily. If the machining learning is determined to be finished (S15: YES), the flow goes to step S16. If the machining learning is determined to be repeated (S15: NO), the flow returns to step S11 and the same processing is repeated.

In step S16, the machine learning device 10 transmits a thermal displacement estimation calculation formula set by the machine learning having been performed before step S16 to each thermal displacement compensation device 20 through the network 40.

The storage unit 13 of the machine learning device 10 stores the thermal displacement estimation calculation formula. By doing so, if a thermal displacement estimation calculation formula is requested from a newly installed thermal displacement compensation device 20, the stored thermal displacement estimation calculation formula can be transmitted to this new thermal displacement compensation device 20. If new teaching data is acquired, further machine learning can be performed with the new teaching data.

<Detail of Machine Learning Method>

As described above, in step S14 of FIG. 4, the calculation formula learning unit 14 performs the machine learning using the teaching data. A method of the machine learning will be described in detail.

As a first method, a coefficient that minimizes a square error between a thermal displacement estimated value and a thermal displacement actual measured value can be inferred and set by machine learning using the least-square method. This thermal displacement estimated value is calculated using the formula (1), specifically, a thermal displacement estimation calculation formula using a first-order lag element in measured data.

More specifically, assuming that measured data is $X_k$ and a label is $Y_L$, a group of a coefficient $a_k$, a coefficient $b_k$, and a coefficient $T_k$ is determined that minimizes a total of values about multiple teaching data pieces obtained from the following formula 3. In this formula, n is a natural number and means the number of measurement points of teaching data used for learning.

[Formula 3]

[Formula 3]

$$(Y_L - Y(t))^2 = \left( Y_L - \sum_{k=1}^{n} a_k \left( \sum_{\tau=0}^{T_k} X_k(t - \tau \Delta t_k) e^{-b_k \tau \Delta t_k} \right) \right)^2 \quad (3)$$

As a second method, a coefficient that minimizes a square error between a thermal displacement estimated value and a thermal displacement actual measured value can be inferred and set by machine learning using the least-square method. This thermal displacement estimated value is calculated using the formula (2), specifically, a thermal displacement estimation calculation formula using a time shift element in measured data.

More specifically, assuming that measured data is $X_k$ and a label is $Y_L$, a group of a coefficient $a_k$, a coefficient $b_{k\tau}$, and a coefficient $T_k$ is determined that minimizes a total of values about multiple teaching data pieces obtained from the following formula 4. In this formula, n is a natural number and means the number of measurement points of teaching data used for learning.

[Formula 4]

[Formula 4]

$$(Y_L - Y(t))^2 = \left( Y_L - \sum_{k=1}^{n} a_k \left( \sum_{\tau=0}^{T_k} b_{k\tau} X_k(t - \tau \Delta t_k) \right) \right)^2 \quad (4)$$

Figure 6A:
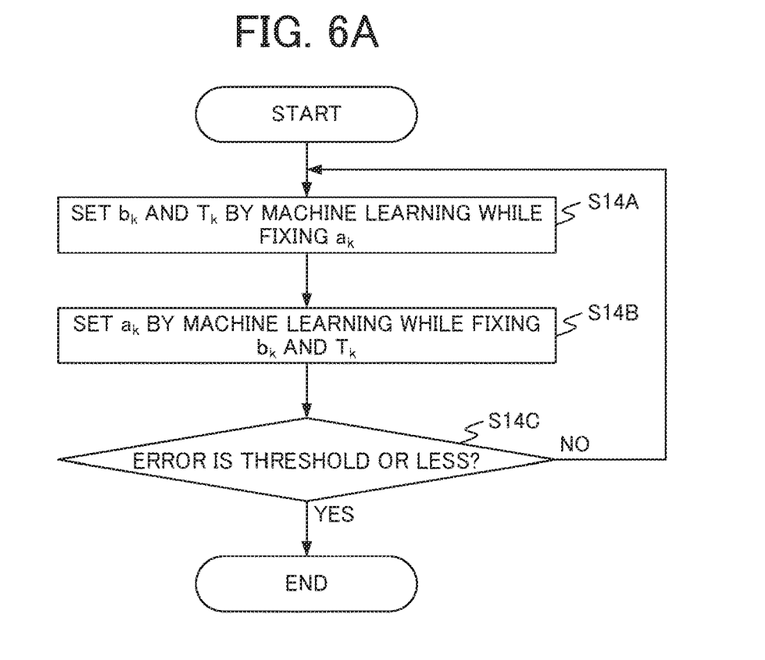
FIG. 6A is a flowchart showing the operation of the machine learning by the machine learning device according to the first embodiment of the present invention.

Regarding $a_k$, $b_k$, and $T_k$ in the formula (1) according to the first method, a group of $a_k$, $b_k$, and $T_k$ is determined by repeating setting of the parameters $b_k$ and $T_k$ relating to time by machine learning while fixing the parameter $a_k$ not relating to time, and setting of the parameter $a_k$ not relating to time by machine learning while fixing the parameters $b_k$ and $t_k$ relating to time. FIG. 6A is a flowchart showing sub-steps of step S14 for implementing this determination method.

In step S14A, the first learning unit 14A sets $b_k$ and $T_k$ by machine learning using teaching data while fixing only $a_k$.

In step S14B, the repetition unit 14C switches the subject of machine learning to the second learning unit 14B. Then, the second learning unit 14B sets only $a_k$ by machine learning using teaching data while fixing $b_k$ and $T_k$ at values set in step S14A.

In step S14C, if an error between a thermal displacement estimated value calculated using a thermal displacement estimation formula using $a_k$, $b_k$, and $T_k$ set at that point and a thermal displacement actual measured value is a threshold or less (S14C: YES), specifically, if the accuracy of the thermal displacement estimation formula at that point becomes a predetermined value or more, the flow is finished. If this error exceeds the threshold (S14C: NO), the flow returns to step S14A. More specifically, in step S14A, the repetition unit 14C switches the subject of machine learning to the first learning unit 14A. Then, the first learning unit 14A sets $b_k$ and $T_k$ by machine learning while fixing only $a_k$ at a value set in step S14B.

Figure 6B:
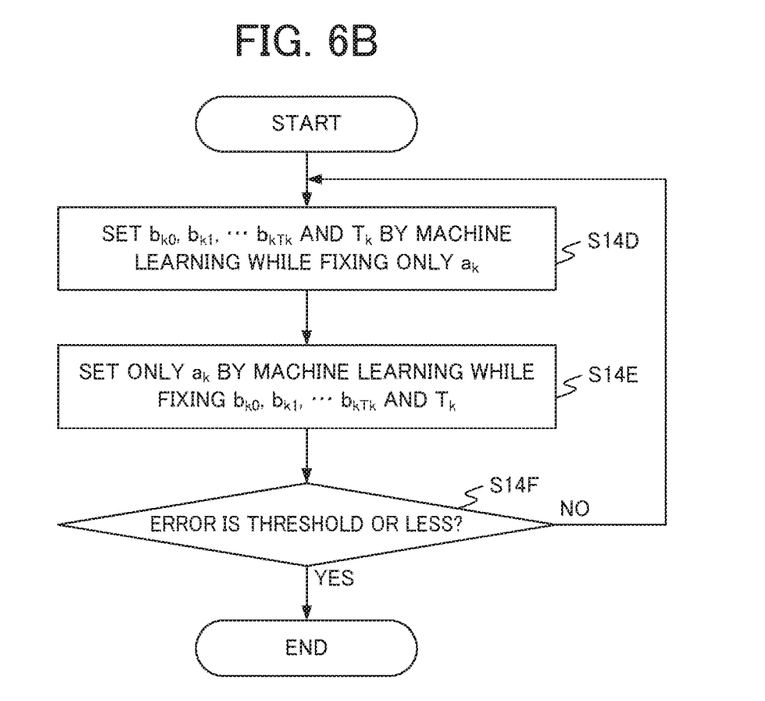
FIG. 6B is a flowchart showing the operation of the machine learning by the machine learning device according to the first embodiment of the present invention.

Regarding $a_k$, $b_{k\tau}$, and $T_k$ in the formula (2) according to the second method, $a_k$, $b_{k\tau}$, and $T_k$ are determined by repeating setting of the parameters $b_{k0}$, $b_{k1}$, ..., $b_{kTk}$ and $T_k$ relating to time by machine learning while fixing the parameter $a_k$ not relating to time, and setting of the parameter $a_k$ not relating to time by machine learning while fixing the parameters $b_{k0}$, $b_{k1}$, ..., $b_{kTk}$ and $T_k$ relating to time. FIG. 6B is a flowchart showing sub-steps of step S14 for implementing this determination method.

In step S14D, the first learning unit 14A sets $b_{k0}$, $b_{k1}$, ..., $b_{kTk}$ and $T_k$ by machine learning using teaching data while fixing $a_k$.

In step S14E, the repetition unit 14C switches the subject of machine learning to the second learning unit 14B. Then, the second learning unit 14B sets only $a_k$ by machine learning using teaching data while fixing $b_{k0}$, $b_{k1}$, ..., $b_{kTk}$ and $T_k$ at values set in step S14D.

In step S14F, if an error between a thermal displacement estimated value calculated using a thermal displacement estimation formula using $a_k$, $b_{k\tau}$, and $T_k$ set at that point and a thermal displacement actual measured value is a threshold or less (S14F: YES), specifically, if the accuracy of the thermal displacement estimation formula at that point becomes a predetermined value or more, the flow is finished. If this error exceeds the threshold (S14F: NO), the flow returns to step S14D. More specifically, in step S14D, the repetition unit 14C switches the subject of machine learning to the first learning unit 14A. Then, the first learning unit 14A sets $b_{k0}$, $b_{k1}$, ..., $b_{kTk}$ and $T_k$ by machine learning while fixing $a_k$ at a value set in step S14E.

<Operation of Compensation>

Figure 7:
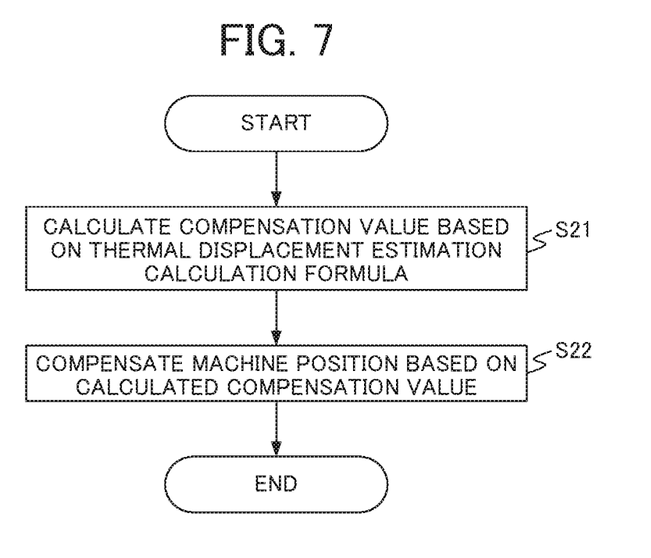
FIG. 7 is a flowchart showing the operation of compensation by the thermal displacement compensation device according to the first embodiment of the present invention.

The operation of compensation in the thermal displacement compensation system 100 according to this embodiment will be described next. FIG. 7 is a flowchart showing the operation of the compensation by the thermal displacement compensation device 20.

In step S21, based on a thermal displacement estimation calculation formula set by the machine learning device 10, the compensation value calculation unit 22 calculates a compensation value corresponding to the thermal displacement of a machine element calculated from a measured data group.

In step S22, the compensation unit 24 compensates the machine position of the machine element based on the compensation value about the machine element calculated by the compensation value calculation unit 22, thereby offsetting the thermal displacement. Unlike the illustration in FIG. 7, the compensation unit 24 may transmit the compensation value about the machine element to the controller 30 in step S22. More specifically, the compensation unit 24 may compensate a coordinate position output from the program reading and interpretation unit 32 of the controller 30 using this compensation value about the machine element, and then output position command data to the motor control unit 33. Alternatively, the compensation unit 24 may compensate the machining programs 31 in advance using this compensation value, and then execute the resultant machining programs 31.

<Effect Achieved by First Embodiment>

As described above, in this embodiment, machine learning is divided by learning by the first learning unit and learning by the second learning unit. The first learning unit sets a coefficient relating to a time lag element. The second learning unit sets a coefficient relating to measured data except the coefficient relating to the time lag element. By doing so, a highly accurate compensation formula can be derived using a small number of calculations.

In this embodiment, if a sensor is added or the position of the sensor is changed, a measurement result obtained from this addition or position change is added to a thermal displacement estimation calculation formula and a variable in a compensation formula based on this thermal displacement estimation calculation formula. Then, machine learning is performed to automatically determine a thermal displacement estimation calculation formula and a compensation formula, thereby increasing accuracy in a simple way.

In this embodiment, the aforementioned time lag element can be a first-order lag element in measured data in a measured data group. This allows compensation by giving consideration to time for heat measured by a temperature sensor to be transferred and to cause thermal expansion.

In this embodiment, the aforementioned time lag element can be a time shift element in measured data in a measured data group. This allows compensation by giving consideration to time for heat measured by the temperature sensor to be transferred and to cause thermal expansion.

In this embodiment, a thermal displacement estimation calculation formula can be set based on a multiple regression analysis model. Using multiple variables in the multiple regression analysis model allows setting of a easily-available and precise thermal displacement estimation calculation formula.

In this embodiment, the aforementioned machine learning device can be incorporated in the controller 30 for the machine tool 35. By doing so, a single inexpensive controller becomes available for realizing compensation based on a highly accurate thermal displacement estimation calculation formula.

The thermal displacement compensation device 20 of this embodiment performs compensation based on a thermal displacement estimation calculation formula set by the aforementioned machine learning device 10. This allows implementation of highly accurate compensation.

In this embodiment, the aforementioned machine learning device 10 can be incorporated in the thermal displacement compensation device 20. By doing so, a single inexpensive thermal displacement compensation device becomes available for deriving a highly accurate compensation formula using a small number of calculations, thereby realizing highly accurate compensation.

A thermal displacement estimation calculation formula and a compensation formula based on the thermal displacement estimation calculation formula can be provided with increased accuracy by means of tuning in response to the operating environment of the machine tool 35 or the type of the machine tool 35.

Second Embodiment

The configuration of a machine learning device 10A according to a second embodiment is the same as that of the machine learning device 10 according to the first embodiment. Thus, the configuration of the machine learning device 10A and the function of a component in the machine learning device 10A will not be described.

Figure 8A:
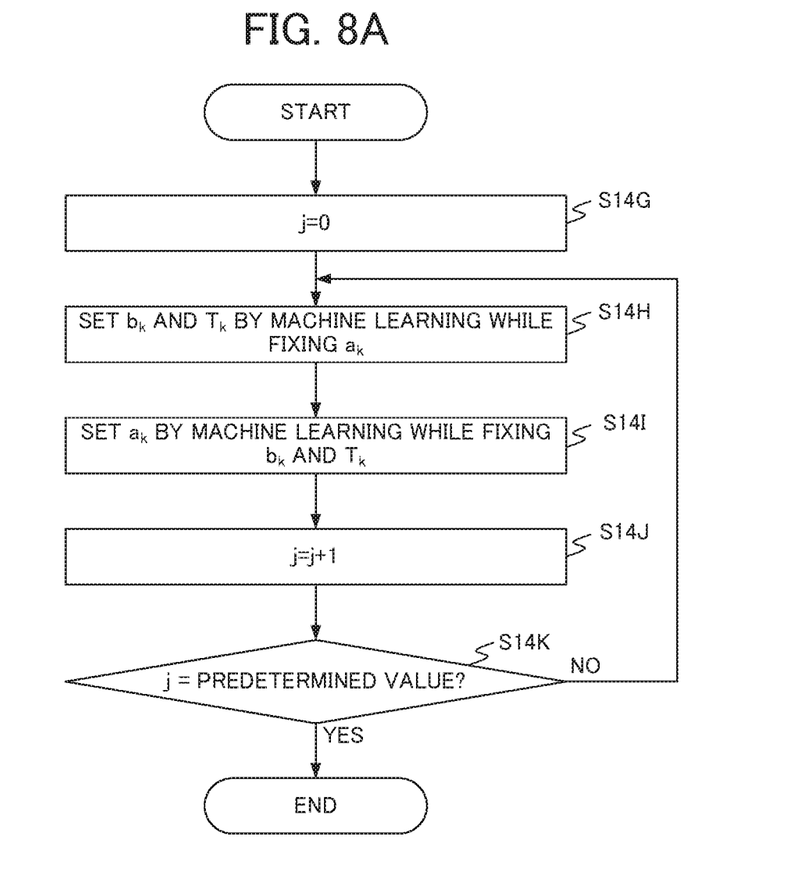
FIG. 8A is a flowchart showing the operation of machine learning by a machine learning device according to a second embodiment of the present invention.

In the first embodiment, regarding $a_k$, $b_k$, and $T_k$ in the formula (1), setting of $b_k$ and $T_k$ by machine learning with $a_k$ being fixed, and setting of $a_k$ by machine learning with $b_k$ and $T_k$ being fixed are repeated. Using a pair of $a_k$, $b_k$ and $T_k$ at a time when an error between a thermal displacement estimated value calculated using a thermal displacement estimation formula and a thermal displacement actual measured value becomes a threshold or less, the thermal displacement estimation formula is determined. Regarding $a_k$, $b_{k\tau}$, and $T_k$ in the formula (2), setting of $b_{k0}$, $b_{k1}$, ..., $b_{kTk}$ and $T_k$ by machine learning with $a_k$ being fixed, and setting of $a_k$ by machine learning with $b_{k0}$, $b_{k1}$, ..., $b_{kTk}$ and $T_k$ being fixed are repeated. Using a group of $a_k$, $b_k$, and $T_k$ at a time when an error between a thermal displacement estimated value calculated using a thermal displacement estimation formula and a thermal displacement actual measured value becomes a threshold or less, the thermal displacement estimation formula is determined. In the second embodiment, regarding $a_k$, $b_k$, and $T_k$ in the formula (1), repeat of the setting of $b_k$ and $T_k$ by machine learning with $a_k$ being fixed and the setting of $a_k$ by machine learning with $b_k$ and $T_k$ being fixed is finished on condition that the number of times this repeat is made reaches a predetermined value. Using a group of $a_k$, $b_k$, and $T_k$ at a time when this condition is satisfied, a thermal displacement estimation formula is determined. FIG. 8A is a flowchart showing sub-steps of step S14 for implementing this determination method.

In step S14G, a repeat count j is set at an initial value 0.

In step S14H, the first learning unit 14A sets $b_k$ and $T_k$ by machine learning using teaching data while fixing only $a_k$.

In step S14I, the repetition unit 14C switches the subject of machine learning to the second learning unit 14B. Then, the second learning unit 14B sets only $a_k$ by machine learning using teaching data while fixing $b_k$ and $T_k$ at values set in step S14H.

In step S14J, j is incremented by one.

In step S14K, if j reaches a predetermined value (S14K: YES), specifically, if step S14H and step S14I have been repeated a predetermined number of times, the flow is finished. If j does not reach the predetermined value (S14K: NO), specifically, if step S14H and step S14I have not been repeated the predetermined number of times, the flow returns to step S14H. More specifically, in step S14H, the repetition unit 14C switches the subject of machine learning to the first learning unit 14A. Then, the first learning unit 14A sets $b_k$ and $T_k$ by machine learning while fixing $a_k$ at a value set in step S14I.

Figure 8B:
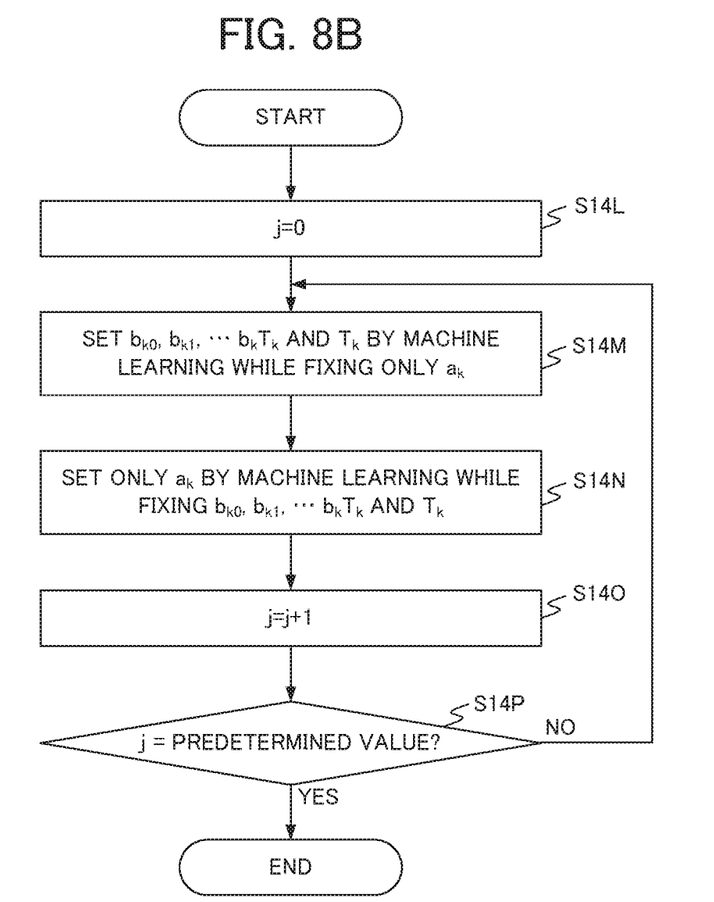
FIG. 8B is a flowchart showing the operation of the machine learning by the machine learning device according to the second embodiment of the present invention.

Regarding $a_k$, $b_{k\tau}$, and $T_k$ in the formula (2), repeat of the setting of $b_{k0}$, $b_{k1}$, ..., $b_{kTk}$ and $T_k$ by machine learning with only $a_k$ being fixed and the setting only of $a_k$ by machine learning with $b_{k0}$, $b_{k1}$, ..., $b_{kTk}$ and $T_k$ being fixed is finished on condition that the number of times this repeat is made reaches a predetermined value. Using a group of at, b r, and $T_k$ at a time when this condition is satisfied, a thermal displacement estimation formula is determined. FIG. 8B is a flowchart showing sub-steps of step S14 for implementing this determination method.

In step S14L, the repeat count j is set at an initial value 0.

In step S14M, the first learning unit 14A sets $b_{k0}$, $b_{k1}$, ..., $b_{kTk}$ and $T_k$ by machine learning using teaching data while fixing $a_k$.

In step S14N, the repetition unit 14C switches the subject of machine learning to the second learning unit 14B. Then, the second learning unit 14B sets only $a_k$ by machine learning using teaching data while fixing $b_{k0}$, $b_{k1}$, ..., $b_{kTk}$ and $T_k$ at values set in step S14M.

In step S14O, j is incremented by one.

In step S14P, if j reaches a predetermined value (S14P: YES), specifically, if step S14M and step S14N have been repeated a predetermined number of times, the flow is finished. If j does not reach the predetermined value (S14P: NO), specifically, if step S14M and step S14N have not been repeated the predetermined number of times, the flow returns to step S14M. More specifically, in step S14M, the repetition unit 14C switches the subject of machine learning to the first learning unit 14A. Then, the first learning unit 14A sets $b_{k0}$, $b_{k1}$, ..., $b_{kTk}$ and $T_k$ by machine learning while fixing only $a_k$ at a value set in step S14N.

<Effect Achieved by Second Embodiment>

As described above, the second embodiment achieves an effect comparable to that achieved by the first embodiment.

Other Embodiments

While the foregoing embodiments are preferred embodiments of the present invention, these embodiments do not limit the scope of the present invention. The present invention is feasible as embodiments to which various changes are added within a range not deviating from the substance of the present invention.

[First Modification]

In the embodiments, a thermal displacement estimation calculation formula is described as a polynomial formulated based on multiple regression analysis of a generalized linear model. However, this is not the only case but the thermal displacement estimation calculation formula may be formulated based on multiple regression analysis of a non-linear model.

[Second Modification]

A configuration may also be such that, if the degree of accuracy of a thermal displacement estimation calculation formula set as a result of machine learning is less than a threshold, a measured data group is optimized by adding measured data and/or by excluding measured data. If a sensor is added and/or a sensor is excluded by a maintenance operator or an end user of a machine tool, the accuracy of thermal displacement compensation is increased by means of automatic tuning of a compensation formula based on a thermal displacement estimation calculation formula. In order to increase the accuracy of thermal displacement compensation, for example, machine learning may be performed using a measured data group obtained by changing the position of a temperature sensor, for example. In this case, a determination can also be made as to whether accuracy is increased, for example, by evaluating a difference between an error between a thermal displacement estimated value calculated using a thermal displacement estimation formula obtained after the position change and a thermal displacement actual measured value, and an error between a thermal displacement estimated value calculated using a thermal displacement compensation formula obtained based on machine learning using a measured data group before the position change and a thermal displacement actual measured value.

[Third Modification]

In the foregoing embodiments, the machine tool 35 is described as a cutting machine. However, the machine tool 35 is not limited to the cutting machine. The machine tool 35 may also be a wire discharge machine or a laser machine, for example.

[Fourth Modification]

The controller 30 may be configured to include the thermal displacement compensation device 20. The controller 30 may alternatively be configured to include the machine learning device 10.

[Fifth Modification]

Each of the machine learning devices 10 and 10A in the foregoing embodiments may be configured as a computer system including a CPU. In this case, the CPU reads a program from a storage unit such as a ROM, for example, and follows the read program, thereby causing the computer to function as the measured data acquisition unit 11, the thermal displacement acquisition unit 12, the storage unit 13, and the calculation formula learning unit 14.

EXPLANATION OF REFERENCE NUMERALS

10 10A Machine learning device
11 Measured data acquisition unit
12 Thermal displacement acquisition unit
13 Storage unit
14 Calculation formula learning unit
14A First learning unit
14B Second learning unit
14C Repetition unit
20 Thermal displacement compensation device
22 Compensation value calculation unit
24 Compensation unit
30 Controller
35 Machine tool
40 Network
100 Thermal displacement compensation system

What is claimed is:

1. A machine learning device that optimizes, by machine learning, a calculation formula used for estimating the thermal displacement of a machine element to be thermally expanded in a machine tool based on a measured data group containing temperature data about the machine element and its surroundings and/or operating state data about the machine element, the machine learning device comprising:
a measured data acquisition unit that acquires the measured data group;
a thermal displacement acquisition unit that acquires a thermal displacement actual measured value about the machine element;
a storage unit that uses the measured data group acquired by the measured data acquisition unit as input data, uses the thermal displacement actual measured value about the machine element acquired by the thermal displacement acquisition unit as a label, and stores the input data and the label in association with each other as teaching data; and
a calculation formula learning unit that performs machine learning based on the measured data group and the thermal displacement actual measured value about the machine element, thereby setting a thermal displacement estimation calculation formula used for calculating the thermal displacement of the machine element based on the measured data group, wherein
the thermal displacement estimation calculation formula uses a time lag element in measured data, and
the calculation formula learning unit comprises:
a first learning unit that, based on a difference between a thermal displacement estimated value about the machine element calculated by substituting the measured data group stored as the teaching data in the storage unit into the thermal displacement estimation calculation formula and the thermal displacement actual measured value about the machine element stored as the label in the storage unit, sets a coefficient relating to the time lag element in the thermal displacement estimation calculation formula by machine learning while making a coefficient relating to the measured data constant, without making the coefficient relating to the time lag element constant;
a second learning unit that sets the coefficient relating to the measured data, without changing the coefficient relating to the time lag element in the thermal displacement estimation calculation formula by machine learning based on the difference while treating the coefficient relating to the time lag element as constant; and
a repetition unit that repeats machine learning by the first learning unit and machine learning by the second learning unit in such a manner that the second learning unit performs the machine learning while treating the coefficient relating to the time lag element as constant in the thermal displacement estimation calculation formula set by the machine learning by the first learning unit, and that the first learning unit performs the machine learning while treating the coefficient relating to the measured data as constant, without changing the coefficient relating to the time lag element in the thermal displacement estimation calculation formula set by the machine learning by the second learning unit.

2. The machine learning device according to claim 1, wherein
the measured data acquisition unit further acquires a second measured data group by adding measured data to the measured data group,
the measured data acquisition unit stores the second measured data group as input data into the storage unit, and
the calculation formula learning unit further sets a second thermal displacement estimation calculation formula used for calculating the thermal displacement of the machine element based on the second measured data group.

3. The machine learning device according to claim 1, wherein the time lag element is a first-order lag element in measured data in the measured data group.

4. The machine learning device according to claim 1, wherein the time lag element is a time shift element in measured data in the measured data group.

5. The machine learning device according to claim 1, wherein the second learning unit performs the machine learning of the thermal displacement estimation calculation formula set based on a multiple regression analysis model.

6. The machine learning device according to claim 1, wherein the machine learning device is incorporated in a controller for the machine tool.

7. A thermal displacement compensation device for a machine tool, comprising: a compensation value calculation unit, wherein, based on the thermal displacement estimation calculation formula set by the machine learning device according to claim 1, the compensation value calculation unit calculates a compensation value corresponding to the thermal displacement of the machine element calculated from the measured data group; and a compensation unit that compensates the machine position of the machine element based on the compensation value about the machine element calculated by the compensation value calculation unit.

8. The thermal displacement compensation device according to claim 7, wherein the thermal displacement compensation device is incorporated in a controller for the machine tool.

9. The machine learning device according to claim 1, wherein the measured data acquisition unit further acquires a second measured data group by removing measured data from the measured data group, the measured data acquisition unit stores the second measured data group as input data into the storage unit, and the calculation formula learning unit further sets a second thermal displacement estimation calculation formula used for calculating the thermal displacement of the machine element based on the second measured data group.

10. The machine learning device according to claim 1, wherein the measured data acquisition unit further acquires a second measured data group by removing measured data from the measured group and adding measured data to the measured data group, the measured data acquisition unit stores the second measured data group as input data into the storage unit, and the calculation formula learning unit further sets a second thermal displacement estimation calculation formula used for calculating the thermal displacement of the machine element based on the second measured data group.

* * * * *